W. C. SQUIER.
DISK DRILL.
APPLICATION FILED MAR. 22, 1915.
1,170,696.
Patented Feb. 8, 1916.
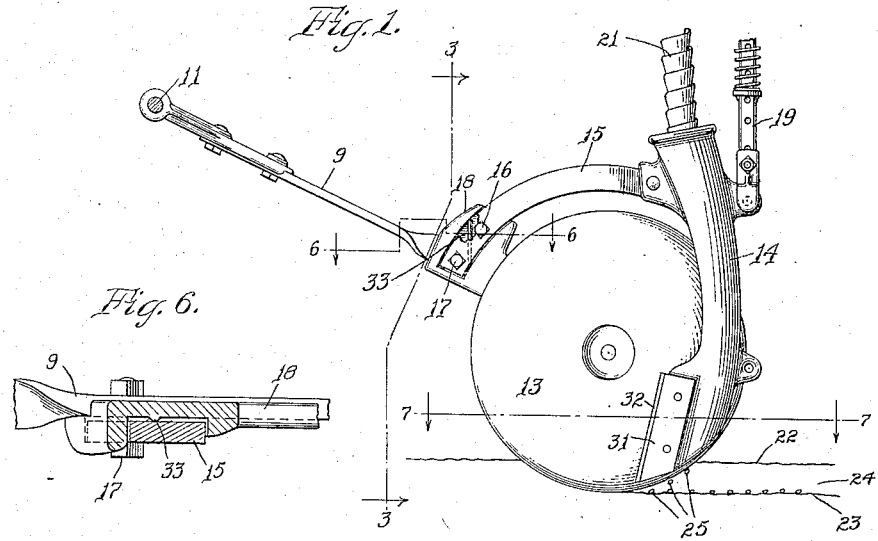
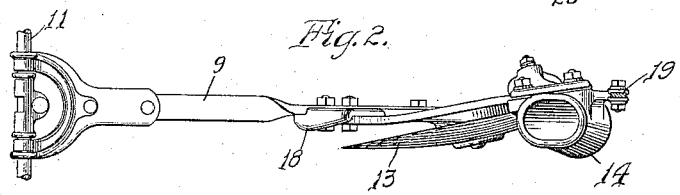
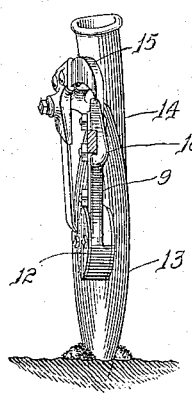
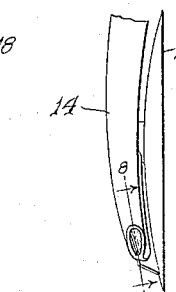
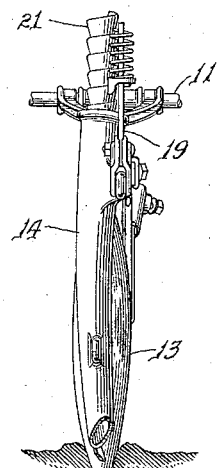
Witnesses:
W. L. Dow.
Della Atkinson
Inventor:
Walter C. Squier
By Pond & Wilson Attys.

UNITED STATES PATENT OFFICE.

WALTER C. SQUIER, OF ROCKFORD, ILLINOIS, ASSIGNOR TO EMERSON-BRANTINGHAM COMPANY, OF ROCKFORD, ILLINOIS, A CORPORATION OF ILLINOIS.

DISK DRILL.

1,170,696.　　　　Specification of Letters Patent.　　Patented Feb. 8, 1916.

Application filed March 22, 1915.　Serial No. 16,145.

*To all whom it may concern:*

Be it known that I, WALTER C. SQUIER, a citizen of the United States, residing at Rockford, in the county of Winnebago and State of Illinois, have invented certain new and useful Improvements in Disk Drills, of which the following is a specification.

This invention relates in general to grain drills, and has more particular reference to the furrow-opening disk and to the means for depositing the seeds in the furrow made by the disk and to the means for freeing the disk from the soil which tends to cling thereto. In the operation of drills of this general character, disks set at an angle to the line of draft of the machine are utilized to produce small furrows in which the seeds or kernels of grain are deposited by boots adjacent to the disks. The best results in the germination of the seeds will be obtained when the seeds are deposited in the bottoms of the furrows where the soil is moist and then covered over with a proper amount of loose soil. If the seeds instead of being deposited in the bottom of the furrow are deposited in the loose soil, a large percentage of them will dry out and fail to sprout. Since the disks by which the furrows are made are relatively small in size and since the furrows are not very deep, it obviously follows that the seeds should be delivered into the furrow as near as possible to a vertical line passing through the center of the disk, which also passes through the deepest point of entry of the disk into the soil. If the seeds are delivered rearwardly of or near to the rear edge of the disk, the bottom of the furrow will be covered with loose dirt which has fallen into it ahead of the seed before the seed is deposited and, as previously explained, a considerable percentage of the seeds will dry out and fail to sprout.

One of the primary objects of my present invention is the provision of a delivery boot which will be capable of depositing the seed upon the bottom of the furrow in close proximity to the central vertical axis of the disk so that they will lie upon the moist soil in the bottom of the furrow and will be covered with a sufficient quantity of loose soil as the drill passes on. The desirability of depositing the seeds at this point in the furrow has long been appreciated, but the accomplishment of the desired result has, so far as I am aware, never been attained prior to my present invention because of the difficulties presented by the practical conditions under which the drill must operate. In the first place, the angle at which the disk may be set and consequently, the width of the furrow which is produced thereby is limited for the reason that if the disk is set at too great an angle to the line of draft, it will not revolve freely nor clean properly and the power required to pull the disk through the soil when set at an excessive angle will be so great that the machine will be utterly impractical. Conceding then that the angle at which the disk may be set is limited, it would seem that in order to deposit seed near the vertical center line of the disk, it would only be necessary to set the boot far enough forward on the disk. Here again, however, practical conditions impose limitations. The end of the boot which projects into the furrow must necessarily be disposed entirely within the furrow wall line cut by the forward edge of the disk or otherwise the boot will drag against the side of the furrow wall thereby greatly increasing the power necessary to move the drill through the soil. Again, the distance between the centers of the disks is at most seven inches and in most drills only six inches and this spacing, when considered in the direction of the line of draft, is reduced very materially by reason of the fact that the disks are set at an angle to the line of draft. If, therefore, the boots are positioned so near the centers of the disks that they still further reduce the clearance between disks, successful operation will be impossible for the reason that clods of earth, sod, weeds and other trash will collect between the disks and around the boots, thereby impairing, if not entirely defeating, successful operation of the machine. It is obvious, therefore, that the boots must be positioned far enough back with respect to the disks to permit the lower end of the boot to travel entirely within the furrow cut by its respective disk and, furthermore, must not be constructed to decrease the normal clearance between the disks.

Because of the practical conditions and limitations above set forth, all drill boots prior to my present invention have been positioned rearwardly or partially rearwardly of the rear edges of the disks with the result that the furrows were partially filled with loose earth before the seeds were deposited and because the seeds were deposited in the loose soil instead of the moist soil in the bottom of the furrow as they should have been, many of the seeds fail to sprout.

My present invention aims to deposit the seeds in the proper position in the furrow and with this end in view, my invention comprises a boot, which is tapered downwardly, curved transversely to conform to the convex face of the disk and curved forwardly at its lower end so that the boot may be positioned forwardly of the rear edge of the disk without decreasing the normal clearance between the disks and also without extending laterally outside of the side wall of the furrow cut by the front edge of the disk. The seeds are, therefore, conveyed by the boot to a point well forward of the rear edge of the disk, but to further facilitate and insure the deposit of the seeds still farther forward and in proximity to the vertical central axis of the disk I have provided at the lower end of the boot bore on the rear wall thereof a forwardly projecting deflector, which deflects the falling seeds and causes them to shoot forwardly and be deposited in the desired position in the bottom of the furrow where they will be properly covered by the loose soil with which the furrow is filled as the machine passes along.

Another object of my invention is to provide a scraper for removing the earth which clings to the convex face of the disk. Various so called scrapers have been designed and employed prior to my invention, but in most instances they have been of yielding construction so that in operation they would be forced away from the face of the disk permitting soil, trash and the like to accumulate on the disk.

My present invention is designed to provide a scraper of rigid construction rigidly attached to and carried by the toe of the boot so that it will be unyieldingly held in contact with the face of the disk and will therefore insure a proper cleaning of the disk.

Furthermore, my improved scraper is designed to clean the disk by shearing action as distinguished from a straight pushing action, this object being accomplished by reason of the fact that the scraping edge of the scraper is disposed at an angle to the radii of the disk so that as the disk revolves under the scraper any given radius is scraped from its outer end toward the center of the disk by a progressive inward shearing operation of the scraper.

A further object of my invention is to provide means whereby the scraper may be adjusted toward and from the disk to produce the required scraping pressure on the disk and to permit required adjustments of the scraper as the same becomes worn away. This adjustment is effected in my present invention by mounting the boot in such a manner that it may be bodily adjusted to thereby bring the scraper in the required position with respect to the disk.

Other objects and many attendant advantages of my invention will be more fully appreciated as the invention is better understood by reference to the following description and when considered in connection with the accompanying sheet of drawings.

Referring to the drawings: Figure 1 is a side elevation of a drill disk and its correlated parts embodying my invention; Fig. 2 is a plan view of the construction shown in Fig. 1; Fig. 3 is a sectional view on the line 3—3 of Fig. 1; Fig. 4 is a rear view of Fig. 1, looking in the direction of the line of draft; Fig. 5 is a rear view, looking in a direction perpendicular to the axis of rotation of the disk; Fig. 6 is a fragmentary sectional view on the line 6—6 of Fig. 1; Fig. 7 is a sectional view on the line 7—7 of Fig. 1, and Fig. 8 is a sectional view on the line 8—8 of Figs. 5 and 7.

On the drawings reference character 9 indicates the drag bar which is pivotally mounted at its forward end on a transversely extending rod or shaft 11 and is provided at its rear end with a box or bearing 12 which carries the rotatable furrow-opening disk 13. The drag bar 9 is disposed parallel with the line of draft of the machine, and from an inspection of Fig. 2, it will be observed that the disk is set at an angle to the line of draft, this angle being determined by practical conditions and limitations as heretofore explained.

The seed delivery boot designated by reference character 14 is rigidly connected at its upper end to the drag bar by means of an arm 15 bolted or riveted at its rear end to the boot and secured by bolts 16 and 17 at its forward end to a casting 18 shaped to receive the arm and carried and rigidly mounted on the drag bar. The boot and the disk are raised and lowered and set to the desired working depth by any well known mechanism (not shown), which is connected with the boot through the intermediary of a bar or rod 19. Seed is delivered from the hopper or seed box in the usual manner through a flexible tube 21 of well known or preferred construction.

In Fig. 1 the reference character 22 designates the top line of the soil in which the machine is working, reference character 23 indicates the bottom of the furrow 24 produced by the disk and 25 indicates the seeds in the position in which they are delivered by the boot.

In Fig. 7, reference character 26 indicates one side wall of the furrow produced by the disk, reference character 27, the other wall and 28 the loose dirt which falls into the furrow back of the disk and covers the seeds.

From the drawings it will be observed that the boot 14 is tapered downwardly so that its lower end is as narrow as it can be practically made, and from Fig. 1, it will be clear that the boot is curved forwardly at its lower end so that from a point above the horizontal center line of the disk the lower portion of the boot is disposed forwardly of the rear edge of the disk. In order to bring the boot as close to the disk as possible so that its lower end will be disposed entirely within the furrow produced by the disk and so that the clearance between the disks will not be diminished, I have curved the boot transversely to follow the curvature of the convex face of the disk as will be best seen from an inspection of Fig. 5, which is a view looking at the rear of the disk and boot in a direction perpendicular to the axis of rotation of the disk. This formation of the boot enables it to be mounted forwardly of the rear edge of the disk so that it will carry the seeds forwardly toward the central vertical line of the disk in order that they may be deposited in the bottom of the furrow. To further assist in the delivery of the seeds to the proper position, I have formed on the rear wall of the boot bore at the lower end thereof a forwardly projecting deflector 29, which deflects the falling seeds forwardly and delivers them substantially in the location illustrated in Fig. 1. By reason of the forward curvature of the lower end of the boot the seeds in following the curvature of the boot are brought into contact with this deflector and are shot forwardly thereby into the desired position in the furrow. From Fig. 7, it will be observed that the deflector 29 is carried forwardly on the outer wall of the boot bore so that the seeds are also deflected toward the disk as well as forwardly when they leave the boot.

The toe of the boot is carried forwardly a limited distance and is shaped to provide a seat for the accommodation of a disk scraper 31, which is made of inflexible steel rigidly riveted to the toe of the boot as shown in Fig. 1. It will be observed that the scraping edge 32 of the scraper extends upwardly and rearwardly from the lower end of the scraper so that any radius of the disk will be progressively scraped toward the center of the disk as the disk revolves by shearing action of the scraper which cleans the disk and throws the dirt away from it in an efficient manner, which offers a minimum of resistance to the rotation of the disk.

In order that the scraper may be adjusted toward and from the disk to exert just the required pressure on the disk and also to permit adjustment when necessary to compensate for wearing of the scraper, I have provided the casting 18 with a rib 33 disposed between the bolts 16 and 17, which serves as a fulcrum upon which the arm 15 may pivot slightly. It will be manifest that by tightening the bolt 17, the arm 15 and the boot 14 carried thereby will be rocked slightly upon the rib 33 as a fulcrum to force the scraping edge of the scraper against the surface of the disk. The scraper, therefore, is adjustable only through bodily movement of the boot which is readily accomplished by slight adjustments of the bolts 16 and 17.

It is believed that the construction, operation, and advantages of my present invention will be fully understood and appreciated from the foregoing without further description and it should be obvious that the various structural details shown for the purposes of illustration are capable of considerable modification without departing from the essence of this invention as set forth in the following claims.

I claim:

1. In a disk drill, the combination of a drag bar, a concavo-convex furrow opening disk rotatably mounted on said bar, so as to be disposed at an angle to the line of draft of the machine, an arm projecting rearwardly from said drag bar above the disk, a downwardly tapered boot rigidly mounted on the rear end of said arm, said boot being curved to conform to the convexity of said disk and curved forwardly at its lower end so as to be disposed in front of the rear edge of said disk and entirely within the furrow produced by the disk, a scraper rigidly attached to the toe of said boot and projecting upwardly and rearwardly in front of the boot, and means for adjusting said arm laterally about its point of connection with said drag bar as a center to thereby adjust the boot and the scraper carried thereby bodily relatively to the disk to bring the scraper into proper scraping relation with the disk.

2. In a disk drill, the combination of a drag bar, a concavo-convex furrow opening disk carried thereby, an arm mounted on said drag bar and projecting rearwardly therefrom, a downwardly tapered boot curved forwardly at its lower end and also laterally to conform to the convex face of the disk rigidly mounted on said arm, a rigid scraper rigidly mounted on the toe of said boot and having a sharpened scraping edge extending upwardly and rearwardly from the lower end thereof at the front of the boot, and means forming the connection between said drag bar and said arm for adjusting the position of the scraper with respect to the disk by bodily adjusting the arm and the boot carried thereby.

3. In a disk drill, the combination of a concavo-convex furrow opening disk disposed at an angle to the line of draft of the machine, a boot positioned adjacent to the convex face of the disk forwardly of the rear edge of said disk, a scraper rigidly mounted on the toe of said boot, with its scraping edge extending upwardly and rearwardly from the lower end thereof in front of the boot and means for adjusting said boot laterally above a point located forwardly of the center of the disk to adjust said scraper toward and from the disk.

4. In a disk drill, the combination of a concavo-convex furrow opening disk disposed at an angle to the line of draft of the machine, a boot extending downwardly adjacent to and following the curvature of said disk on the convex side thereof, the lower portion of the boot from a point above the horizontal center of the disk being disposed entirely within the periphery of the disk, the bore of said boot adjacent its lower end being provided with a deflector extending inwardly from the rear wall to deflect the falling seeds forwardly, a rigid scraper rigidly mounted on the toe of said boot and so constructed that the scraping edge extends upwardly and rearwardly in front of the boot, and means for adjusting the boot to vary the position of the scraper.

5. In a disk drill, the combination of a drag bar, a furrow opening disk rotatably mounted on said bar so as to be disposed at an angle to the line of draft of the machine, an arm projecting rearwardly from said drag bar above the disk, a downwardly tapered boot rigidly mounted on the rear end of said arm, a scraper rigidly attached to the toe of said boot, and means in front of the center of the disk for adjusting said arm laterally about its point of attachment to said drag bar to thereby adjust the boot and the scraper carried thereby, bodily relatively to the disk to bring the scraper into proper scraping relation with the disk.

6. In a disk drill, the combination of a drag bar, a furrow opening disk mounted thereon, an arm mounted on said drag bar and projecting rearwardly therefrom, a downwardly tapered boot curved forwardly at its lower end and shaped to conform to the convex face of the disk rigidly mounted on said arm, the rear wall of the boot bore being provided at its lower end with a forwardly projecting deflector to throw the grains of seed forwardly from the delivery end of the boot, a rigid scraper rigidly mounted on the toe of said boot and having a sharpened scraping edge extending upwardly and rearwardly from the lower end thereof at the front of the boot, and means for adjusting the position of the scraper with respect to the disk by bodily adjusting the boot.

WALTER C. SQUIER.

Witnesses:
J. WM. LARBER,
J. H. MILLER.